Inventor
Gaetan De Coye De Castelet
By Stevens, Davis, Miller & Mosher
Attorneys

United States Patent Office 3,299,794
Patented Jan. 24, 1967

3,299,794
VEHICLE VENTILATION DEVICES
Gaëtan de Coye de Castelet, Billancourt, France, assignor to Regie Nationale des Usines Renault, Billancourt, France
Filed Feb. 8, 1965, Ser. No. 431,005
Claims priority, application France, Feb. 12, 1964,
963,482, Patent 1,393,501
2 Claims. (Cl. 98—2)

This invention relates to a device for ventilating the interior of a vehicle, which device is mounted on the roof of the vehicle, preferably above each passenger, and permits, by simple manual actuation of the ventilation device, either of introducing fresh air into the body of the vehicle, or of sucking out the interior air and expelling it into the surrounding atmosphere. Said ventilation device consists essentially of a cock-plug which is movable in a housing mounted on the roof and which is formed with air inlet and outlet orifices and provided with deflecting vanes which, depending on the orientation of the cock-plug either enable air to be drawn into the body when said cock-plug is turned in the direction of the dynamic pressure, or air to be extracted from the body through a suction effect. By reason of its compactness, such a ventilation device can be mounted in the roof of the vehicle above each passenger, thereby enabling each passenger to control his own ventilation independently.

Figure 1:
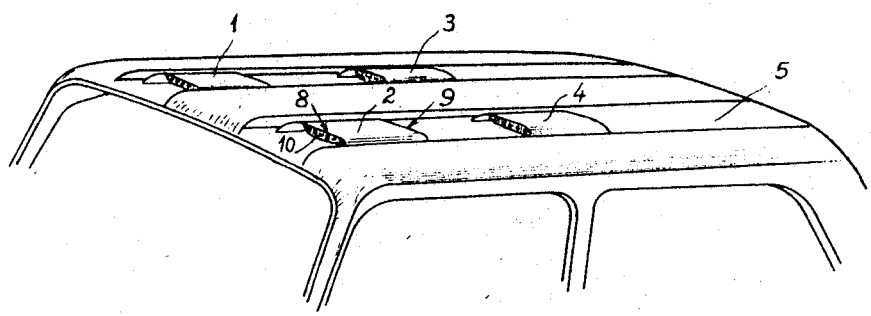
Figure 2:
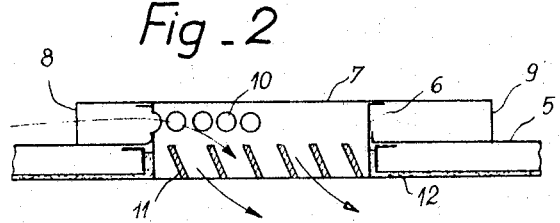
Figure 3:
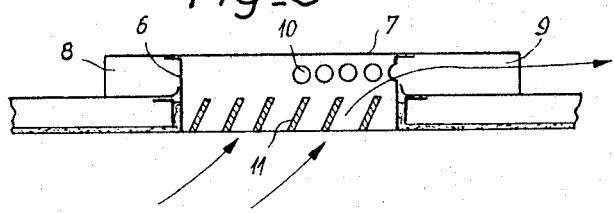
Figure 4:
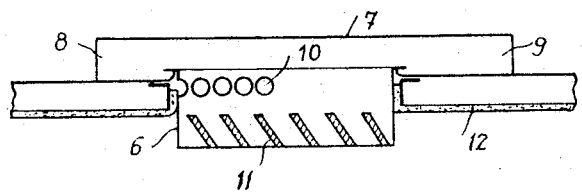

The invention further relates to certain constructional details which will be more particularly described with reference to the accompanying nonlimitative exemplary drawing, in which:

FIGURE 1 shows the roof of a vehicle body equipped with individual ventilation devices according to the invention;

FIGURES 2 and 3 are sectional views on an enlarged scale of the ventilation device, taken through a plane parallel to the longitudinal axis of the vehicle, showing said device in its positions for drawing in the external air and extracting the internal air of the vehicle body, respectively; and FIGURE 4 shows in section an alternative constructional form of the ventilation device of this invention.

Referring more particularly to FIGURE 1, the individual ventilation devices shown thereon are designated by reference numerals 1, 2, 3, 4 and mounted on the roof 5 of the vehicle.

In the form of embodiment shown in FIGURES 2 and 3, the ventilation device consists basically of a sleeve or cock-plug 6 fitted into a hole drilled in the roof 5 and rotatable therein responsively to a manual control conveniently mounted on the roof. The cock-plug 6 is covered on the external side of the roof by a protective cowl 7 providing forward and rear apertures 8 and 9. An appropriate number of orifices 10 is provided in the upper part of the cock-plug, and deflecting vanes 11 in the bottom part thereof. In the specific constructional form shown by way of example in FIGURES 2 and 3, the orifices 10 are formed in the cock-plug half-circumference in such manner as to register with the inclined vanes 11, whereby, when the vehicle is moving and the cock-plug placed in the position of FIGURE 2, the surrounding air is able to pass into the body of the vehicle along the arrows shown in FIGURE 2, whereas in the position of FIGURE 3 the air inside the vehicle body can be expelled into the surrounding atmosphere responsively to the suction effect created by the flow along the arrows in FIGURE 3.

The cock-plug 6 could be controlled by the passenger from inside the vehicle by simply actuating said vanes directly, or through the medium of a handle rigid with the cock-plug. The latter is mounted in the roof of the vehicle so as not to protrude beneath the ceiling trim 12.

Both the rate and orientation of the air flow can be adjusted by positioning the cock-plug as required, whereby to use a specific number of orifices for the intake or expulsion of the air and to direct the same by deflecting the vanes in the necessary direction.

The ventilation device can be rendered inoperative by any convenient means for shutting off the cock-plug.

In an alternative embodiment, the orifices 10 are arranged over a quarter-circumference of the cock-plug and are orientable forwardly or rearwardly as precedingly, but can assume a third position in the same horizontal plane wherein the ventilation device can be shut off completely by turning the orifices sideways and thereby causing them to be masked by one of the two suitably shaped side walls of the cowl covering the ventilation device.

Reference is lastly had to FIGURE 4 for yet another alternative constructional form in which the cock-plug 6 is identical to that of FIGURES 2 and 3 but in which, in addition to the rotation that can be imparted to it for adjusting the ventilation, said cock-plug 6 is slidable vertically in its roof support in such manner as to permit shutting off the ventilation by a downward displacement of the cock-plug in its circular housing, and partly opening the ventilation by adjusting the vertical position of the cock-plug. In this constructional form, the cock-plug is made of a flexible or semi-flexible material in order to avoid impact injury to the passengers in the event of an accident.

What is claimed is:

1. A ventilation device for automobile vehicles comprising an opening in the roof of said vehicle, a protective cowl mounted above said opening and provided with forward and rearward orifices therein, a cock-plug rotatable within a housing mounted in said opening and protruding slightly therefrom, a plurality of orifices formed over part of the circumference of the upper portion of said cock-plug, a plurality of deflecting vanes arranged across the lower portion of said cock-plug, said cock-plug being manually orientatable by rotation thereof so that one direction corresponds to that of the dynamic air pressure to permit outside air to penetrate the vehicle body and another direction corresponds to a negative pressure created by the vehicle to exert an extraction effort of the air within the vehicle.

2. A ventilation device intended for mounting on the roof of a vehicle comprising an opening in the roof of said vehicle, a housing mounted in said opening, a cock-plug rotatably mounted in said housing a plurality of orifices formed over at least a quarter of the circumference of said cock-plug at the upper end thereof, a plurality of deflecting vanes located in the lower portion of said cock-plug in register with said orifices, said cock-plug being orientatable manually by rotation thereof in two opposite directions to correspond with an orifice forward position wherein dynamic air pressure permits outside air to penetrate the vehicle body and an orifice rearward position wherein negative pressure is created through an extraction effort of the air on the vehicle body, a protective cowl providing forward and rear apertures mounted on said roof and substantially encompassing said cock-plug, and said cock-plug being vertically movable to mask its orifices by the walls of said housing to thereby shut-off ventilation therethrough.

References Cited by the Examiner
UNITED STATES PATENTS 2,158,332   5/1939   Lintern ---------------- 98—2
2,248,329   7/1941   Bell ------------------ 98—2

MEYER PERLIN, *Primary Examiner.*